April 4, 1950 F. B. JOHNSON 2,502,958
SIMULTANEOUS HYDROGENATION AND DEHYDROGENATION
Filed May 14, 1946
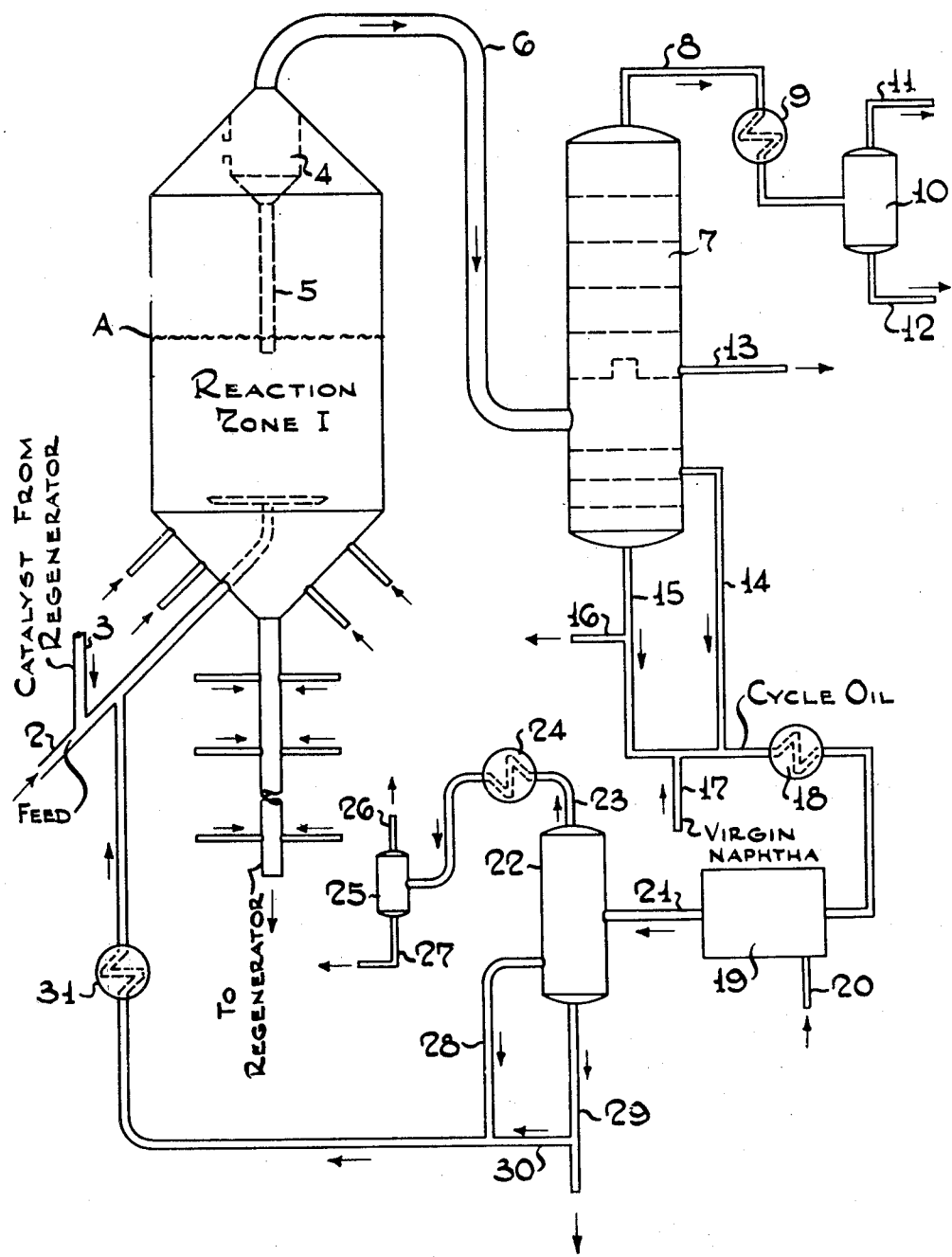
Frank B. Johnson Inventor
by P. J. Whelan Attorney Patented Apr. 4, 1950

2,502,958

UNITED STATES PATENT OFFICE 2,502,958

SIMULTANEOUS HYDROGENATION AND DEHYDROGENATION

Frank B. Johnson, Baton Rouge, La., assignor to Standard Oil Development Company, a corporation of Delaware Application May 14, 1946, Serial No. 669,501

5 Claims. (Cl. 196—52)

1

The present invention is concerned with an improved process for the preparation of hydrocarbon products. It is more specifically concerned with a process for the preparation of gasolines having improved octane numbers and cycle stocks of improved cracking characteristics. In accordance with the present process naphthas and cracking cycle stocks are simultaneously treated to hydroform the naphtha and to hydrogenate the cycle stock.

It is well known in the art to hydrogenate hydrocarbon oils so as to saturate aromatic and olefinic hydrocarbons without causing cracking to any substantial degree. For example it is known that it is desirable to hydrogenate a hydrocarbon oil such as the gas oil remaining unconverted from a cracking operation before it is recycled to the cracking zone. It is also well known that by hydrogenating oils of this character, the amount of coke subsequently formed in the cracking operation will be appreciably decreased since the unsaturated compounds which normally contribute a large portion of the coke have been removed. In addition, the refractoriness of the hydrogenated cycle stock is considerably less than that of the original cycle stock.

Catalysts used usually comprise sulfides and oxides of metallic elements of group VI or group VIII of the periodic system or mixtures of the same. These catalysts may be supported on inert carriers such as alumina, silica or diatomaceous earth. Specific catalysts are for example, molybdenum sulfide on activated alumina, a mixture of nickel sulfide and tungsten sulfide or, for example, 10% molybdenum oxide supported on 90% alumina.

Pressures in a hydrogenation process vary appreciably and may be as high as 200 atmospheres and above. However, in general the pressures are in the range from about 200 lbs. per sq. in. to 1,000 lbs. per sq. in. with the temperatures in the range from about 300° F. to 1200° F. In general the temperatures of the reaction are somewhere around 700° F. to 1000° F. The feed rates vary widely, but are generally in the range from 0.5 to 4 volumes of feed per volume of catalyst per hour. The amount of hydrogen introduced per mol of feed is in the range from about 10 to about 20 mols of hydrogen per mol of feed.

It is also well known in the art to treat various petroleum fractions, particularly virgin naphthas, under certain temperatures and pressures in the presence of hydrogen under conditions whereby there is no net consumption of hydrogen. The principal reaction is one of dehydrogenation accompanied by cyclization and isomerization. These reactions are generally conducted at temperatures in the range from about 800° F. to about 1100° F., preferably in the range from 880° F. to 1050° F. The catalysts employed usually are oxides of a group II, group V or a group VI, or group VIII metal, supported on a suitable base such as, activated alumina, magnesia, silica or the like. For example, a very desirable catalyst comprises 5% to 20% of molybdenum oxide supported on activated alumina. The reaction is conducted at a pressure in the range from about 150 to 400 lbs./sq. in. Hydrogen is generally produced in this operation to the extent of about 200 to 1000 cu. ft. per barrel of oil feed.

In accordance with my invention I propose to combine the above described operations, particularly with respect to the dehydrogenation of virgin naphthas and the hydrogenation of catalytic cracking cycle oils under conditions whereby unexpected desirable results are obtained. The process of my invention may be more readily understood by reference to the drawing illustrating one modification of the same.

Feed gases are introduced into reaction zone 1 by means of feed line 2. Fluid catalyst is mixed with the feed gases by means of line 3 and likewise introduced with the feed into reaction zone 1. The upper level of the dense catalyst zone in reaction zone 1 is maintained at point A. Temperature and pressure conditions in reaction zone 1 are adjusted to secure the desired amount of cracking. For the purpose of description, it is assumed that the feed gases to reaction zone 1 comprise a hydrocarbon petroleum fraction boiling in the range from about 400 F. to 1000° F. The reaction products are withdrawn through cyclone separator 4 in which catalyst fines are separated and returned to the mass of the catalyst by means of line 5. The reaction products substantially free of catalyst are withdrawn overhead by means of line 6 and introduced into fractionation zone 7. In fractionation zone 7 a hydrocarbon product having about a 400° end point is removed overhead by line 8, condensed in cooling zone 9 and introduced into separation zone 10. Uncondensed vapors are removed overhead from separation zone 10 by means of line 11 while the condensed product is removed by means of line 12 and handled in any desirable manner for securing any number of fractions of the desired specifications. A fuel oil stream is removed from fractionation zone 7 by means of line 13 and similarly treated to secure any number of fractions of the desired specifications. It is to be understood that any number of side streams may be withdrawn from fractionation zone 7.

A heavy cycle oil fraction is withdrawn from the bottom of fractionation zone 7. Heretofore, it was undesirable to recycle this stream to the catalytic cracking zone due to the fact that the heavy unsaturated products in this stream greatly increased the amount of coke and gummy substances formed which appreciably decreased the life and activity of the catalyst. Furthermore, if this stream were recycled more severe cracking conditions must be employed since it is considerably more refractory than the virgin feed oil. In accordance with the process of my invention, I propose to remove this cycle oil cut preferably at an intermediate point by means of line 14. If this operation is carried out, a relatively small, heavy stream is removed from the bottom of fractionation zone 7 by means of line 15 and taken from the system by means of line 16. This latter stream may contain catalyst fines not completely removed in cyclone separation zone 4. However, the cycle oil may be removed directly from the bottom of fractionation zone 7 by means of line 15.

In accordance with my invention, I introduce into the cycle oil a virgin naphtha by means of line 17. The combined stream is then heated to the desired temperature in heating zone 18 and introduced into reaction zone 19. In accordance with the process of my invention conditions in reaction zone 19 are maintained to secure simultaneous hydroforming of the virgin naphtha and hydrogenation of the cycle oil. Hydrogen may be introduced into reaction zone 19 by means of line 20.

Upon completion of the desired time of contact, reaction products are withdrawn from reaction zone 19 by means of line 21 and introduced into fractionation zone 22. The hydroformed virgin naphtha is removed overhead by means of line 23, condensed in cooling zone 24 and introduced into separation zone 25. Uncondensed gases which contain hydrogen are removed overhead by means of line 26 and recycled back to line 20. Hydrogen produced over that required for the hydrogenation of the cycle stock may be removed from the system. The hydroformed naphtha is removed by means of line 27 and subsequently handled to secure fractions of any desired specifications. The hydrogenated cycle stock is removed as a bottoms stream from fractionation zone 22 by means of line 29 and returned to the cracking zone by means of line 30. However, the cycle oil may be withdrawn as a side stream by means of line 28 and a heavy relatively small bottoms stream may be removed from the system by means of line 29. Part of the hydrogenated cycle oil may be recycled to the hydrogenation zone 19 if the hydrogenation was not completed in one pass through this unit. The cycle oil stream is then heated to the desired temperature in heating zone 31 and recycled to the reaction zone by means of line 2.

The process of my invention may be more readily understood by the following example illustrating the same.

Example

In two operations a mixture comprising 50% methylcyclohexane and 50% methylnaphthalene was treated under conditions and with the results as shown in the following table. Catalyst employed was a mixture of tungsten sulfide and nickel sulfide, mol ratio of one to two respectively.

| Operating Conditions | Operation I | Operation II |
|---|---|---|
| Hours—Run | 9 | 19 |
| Pressure p. s. i. g | 750 | 750 |
| Temperature | 900 | 890 |
| Feed Rate v./v./hr | 1.0 | 0.5 |
| Gas Rate CF/B | 6,000 | 6,000 |
| CONVERSION {METHYLCYCLOHEXANE TO TOLUENE / METHYLNAPHTHALENE TO TETRALINS} | | |
| To Toluene, Mol per cent | 55 | 60 |
| To Tetralins, Mol per cent | 27 | 26 |

It is apparent that substantial conversion of aromatics to naphthenes occurred and that methylcyclohexane was dehydrogenated to toluene.

A catalytic cracked cycle stock comprises methylnaphthalene type compounds, whereas, virgin naphthas comprises methylcyclohexane type compounds.

The process of the present invention may be widely varied. In general my invention comprises a continuous process wherein I simultaneously hydroform one stream and hydrogenate another. It is particularly applicable in handling virgin naphtha streams in conjunction with cycle oil streams.

The preferred modification of my invention is to treat a cycle oil stream secured from a catalytic cracking operation with a virgin naphtha, preferably with a heavy virgin naphtha boiling in the range from about 200° F. to 400° F.

The temperatures maintained in the hydroforming hydrogenation zone may be in the range from about 700° F. to 950° F. However, it is preferred that the temperature be in the range from about 890° F. to 910 F. The pressures may likewise vary from about 200 lbs. per sq. in. to 750 lbs. per sq. in. However, it is preferred that the pressures in the range from about 700 lbs. per sq. in. to 750 lbs. per sq. in. and that the mol ratio of hydrogen to hydrocarbon be in the range from 5 mols of hydrogen to 9 mols of hydrogen, preferably about 7 mols of hydrogen per mol of hydrocarbon.

The preferred feed rates are in the range from 0.25 to 3 volumes of vapors per volume of catalyst per hour. In general it is desirable that the feed rates be in the range from 0.5 to 1.5 volumes of vapors per volume of catalyst per hour.

The catalyst may comprise metal oxides or sulfides of the metal selected from groups II, V, VI and VIII supported on suitable bases, such as activated alumina, magnesia, silica or the like. A particularly satisfactory catalyst comprises from about 10% to 20% molybdenum oxide, especially about 10% molybdenum oxide supported on alumina. Another catalyst which may be employed is a mixture of nickel and tungsten sulfides.

By operating in accordance with the present process various advantages are to be secured. The octane number of the naphtha is improved appreciably by the present process, as well as, the characteristics of the cracking stock. Furthermore, tremendous advantages are secured with respect to the transfer of heat from the exothermic reaction to the endothermic reaction, as well as, the handling of the necessary hydrogen.

The process of the present invention is not to be limited by any theory as to the mode of operation, but only in and by the following claims.

I claim:

1. Improved process for the preparation of petroleum hydrocarbon products which comprises subjecting a gas oil to cracking conditions in a catalytic cracking zone, permitting the said gas oil to remain resident in the cracking zone for a sufficient period of time to effect the desired cracking, segregating from the reaction products a 400° F. end point gasoline, a fuel oil fraction a bottoms heavy condensate fraction containing catalyst particles, and an intermediate condensate fraction containing polycyclic aromatics and having a boiling range above said gasoline fraction and said fuel oil fraction, combining said intermediate condensate fraction with a virgin naphtha containing naphthenes and passing the combined stream to a second reaction zone wherein conditions are maintained to hydrogenate said intermediate condensate fraction and hydroform the virgin naphtha in the presence of added hydrogen and a catalyst, withdrawing the reaction products from the second reaction zone, separating hydroformed virgin naphtha from the hydrogenated intermediate condensate fraction and recycling said hydrogenated intermediate fraction to said catalytic cracking zone.

2. The process as set forth in claim 1 in which the reaction in the second reaction zone is carried out at a temperature within the range of from 700° F. to 950° F. while maintaining a pressure of from about 200 to about 750 pounds per square inch.

3. The process as set forth in claim 1 in which the catalyst employed in the second stage is selected from the class consisting of oxides and sulfides of metals of groups II, V, VI and VIII of the periodic system.

4. The process according to claim 1 in which the catalyst employed in the second reaction zone comprises a mixture of nickel and tungsten sulfides.

5. Improved process for the preparation of petroleum hydrocarbon products which comprises subjecting a gas oil to cracking conditions in a catalytic cracking zone containing a finely divided cracking catalyst, permitting the said gas oil to remain resident in the cracking zone for a sufficient period of time to effect the desired cracking, segregating reaction products from the catalytic cracking treatment into a 400° F. end point motor fuel fraction, an intermediate gas oil fraction containing polycyclic aromatics and boiling above said motor fuel fraction, and a bottoms oil fraction containing catalyst particles, combining said intermediate gas oil fraction with a virgin naphtha containing naphthenes and passing the combined stream of intermediate gas oil fraction and virgin naphtha to a separate reaction zone wherein the combined stream is contacted with hydrogen and with a catalyst under conditions to hydrogenate the gas oil and hydroform the virgin naphtha, withdrawing the reaction products from said separate reaction zone, separating the hydroformed virgin naphtha from the hydrogenated intermediate gas oil fraction and recycling said hydrogenated intermediate gas oil fraction to said catalytic cracking zone.

FRANK B. JOHNSON.

REFERENCES CITED

The following references are of record in the file of this patent:

UNITED STATES PATENTS

| Number | Name | Date |
|---|---|---|
| 2,334,159 | Friedman | Nov. 9, 1943 |
| 2,340,974 | Myers | Feb. 8 1944 |
| 2,398,846 | Munday | Apr. 23, 1946 |
| 2,407,492 | Hall et al. | Sept. 10, 1946 |

FOREIGN PATENTS

| Number | Country | Date |
|---|---|---|
| 420,235 | Great Britain | Nov. 28, 1934 |